Sept. 13, 1960   H. H. VANDERZEE ET AL   2,952,463
RECORD SELECTING MECHANISM
Filed Nov. 3, 1954   7 Sheets-Sheet 6

INVENTORS
H. H. Vanderzee and
George S. Brown Jr.
BY
L. F. Hammand
Atty.

Sept. 13, 1960 H. H. VANDERZEE ET AL 2,952,463
RECORD SELECTING MECHANISM
Filed Nov. 3, 1954 7 Sheets-Sheet 7

INVENTORS.
H. H. Vanderzee and
George S. Brown, Jr.
BY
L. F. Hammand, Atty.

United States Patent Office 2,952,463
Patented Sept. 13, 1960

2,952,463
RECORD SELECTING MECHANISM

Harry H. Vanderzee and George S. Brown, Jr., Grand Rapids, Mich., assignors, by mesne assignments, to Automatic Music, Inc., Grand Rapids, Mich., a corporation of Delaware Filed Nov. 3, 1954, Ser. No. 466,554

13 Claims. (Cl. 274—10)

The present invention relates to record changing mechanisms for automatic phonographs, and to an improved record selecting mechanism suited to record changers having a magazine capacity of two hundred or more selections.

It is a primary object of the invention to provide a record changer having a unique selecting system of greatly simplified construction wherein the multitude of individual selector magnets conventionally employed in record changers of large magazine capacity is entirely eliminated. Obviously, this results in elimination of the multiple electrical leads ordinarily required to energize the selector magnets, and does away with the bulky electrical cables, multi-contact connectors and multitudinous soldered joints which the magnet banks used in most present day commercial machines require.

A further object of the invention is the provision of a selecting mechanism of such design and construction that it is practicable to provide relatively large, adequately powered magnets or solenoids for all electrically actuated mechanisms, so that unduly delicate adjustments are unnecessary, yet whereby positive, dependable operation is assured.

The foregoing objects are accomplished according to the present teaching by the provision of an accumulating selector wherein the selections are made by "setting" one or more of a series of simple selector "stops" by a single actuator, arranged to move to them individually. As shown, these stops are in the form of short metal pins, and in the arrangement illustrated, they are "set" by shifting them physically, although it is also contemplated that they may be set by magnetizing or demagnetizing them. Since the number of selector stops corresponds to the number of selections available on both faces of the records in the magazine of the machine, any number of desired selections may be made. The record player is then controlled by sensing scanners arranged to traverse the entire series of selector stops and play the selections corresponding to those which have been "set."

In addition to the above, it is a further object of the invention to provide a selecting mechanism wherein the operating parts are sufficiently simple, light, compact and inexpensive as to meet practical limitations of cost, space and weight, and to provide an improved selector wherein the individual selector elements are "set" by simple, direct-acting, motor-driven mechanisms without resort to ratchets, springs, escapements, etc., which are often undependable in operation and impractical for commercial use.

A still further object of the invention is the provision of an improved and simplified selecting system as outlined above, yet so constructed that it is equally well adapted for use in connection with selector push buttons, impulse transmitters or manual control means.

A still further object is the provision of an improved selector wherein the selection receiving mechanism of the record changer of an automatic phonograph is "compatible"; that is, suited for use with impulse transmitting remote control wall boxes heretofore in use and designed for prior types of equipment.

An illustrative embodiment of the invention is shown in the drawings of this specification wherein.

Figures 1, 2:
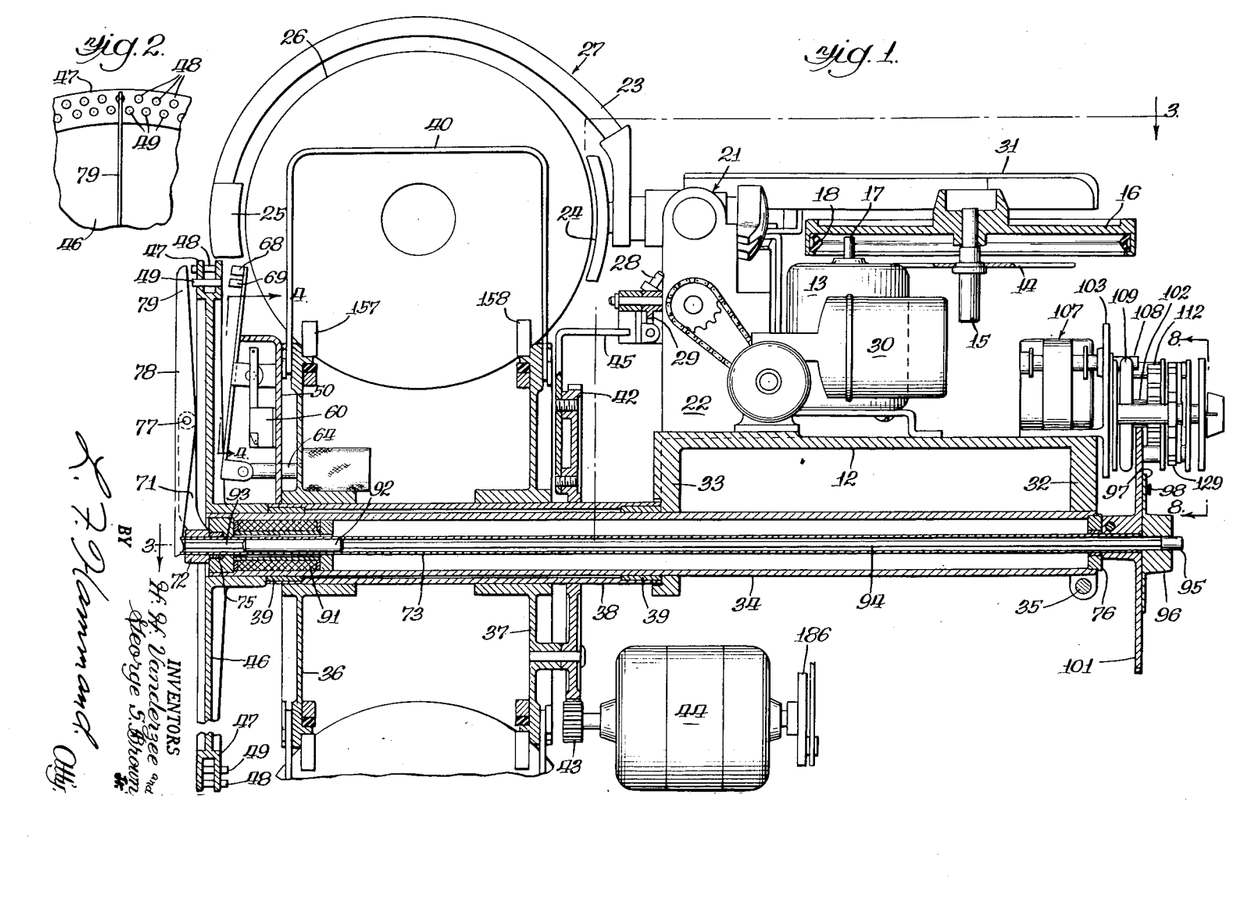
Figure 1 is a central sectional view through a phonographic record changer utilizing the principles of the present teachings.
Figure 2 is a fragmental detail view of a portion of the rim of a selector wheel employed in the illustrated record changer.

The principal operating parts of the record changing mechanism here illustrated are mounted on and supported by a base casting 12. The base 12 supports a turntable driving motor 13 and supporting plate 14 upon which a vertical turntable pivot stud 15 is carried. A turntable 16 is mounted in any conventional manner. As shown, it is freely pivoted on a fixed stud 15 and is driven through conventional speed reducing drive mechanism (not shown) between the armature shaft of the motor 13 and the driving pinion 17, which is held in light frictional engagement with a resilient inner ring or lining 18 on the turntable rim.

A transfer mechanism, generally indicated at 21, is mounted on a pedestal 22 affixed to the upper face of the base 12 in a position closely adjacent the rim of the turntable. The transfer mechanism includes a semicircular record arm 23 having V-blocks 24 and 25 on its inner and outermost ends respectively, to engage the opposite peripheral edges of a disc record 26 in the magazine 27. This transfer mechanism serves to lift a selected record from the magazine and move it from its vertical position in the magazine to horizontal position on the turntable, in a well known manner. It will be understood, of course, that the record transfer mechanism includes selective devices such as paired turning pins 28 mounted in a shiftable rocker mount 29 so that the mechanism, when energized by its driving motor 30 will place the record on the turntable with either face uppermost according to the selection made. To this end it is contemplated that the entire record transfer mechanism, record arm, pedestal and associated mechanisms may be substantially as illustrated and described more fully in Vanderzee Patent No. 2,666,649. The mechanism for controlling the turntable motor 13 and the tone arm 31 may also be of the general type illustrated and described in said prior patent.

The record magazine 27 of the present mechanism is of toroidal form, having the individual records in generally face-to-face relationship with each other, but radially disposed so that they form a substantially complete circle or "doughnut" having its central axis horizontally disposed at a level somewhat below the axis of the record transfer mechanism, so that the uppermost record 26 of the magazine is in alignment with the V-lifting blocks 24 and 25 of the record arm 23.

As shown in the present drawings, the base 12 of the machine includes a pair of downwardly extending bracket arms 32 and 33 in which a hollow tube or sleeve 34 is mounted. Clamping means 35 are provided to hold the sleeve rigidly in the brackets, with one end of the sleeve projecting rearwardly from the bracket 33 to support the record magazine.

The record magazine 27 consists essentially of a pair of flanged circular discs 36 and 37 each having their hubs mounted on a sleeve 38 surrounding the rearward end of the sleeve 34 and rotatably journaled thereon in bushings 39. The discs 36 and 37 serve as mounts for a plurality of U-shaped wire bails 40 disposed between the individual records 26 of the magazine to serve as separators therefor. Semicircular guide rails 41 may be arranged around the lower half of the magazine if desired (Figure 3), or other retaining means hereinafter described may be provided to prevent accidental dislodgement of the records as the magazine is rotated. The magazine rotates as a unit about the sleeve 34. To this end the magazine is provided with a gear 42 secured to the forward face of the disc 37 and arranged to be driven by the pinion 43 of a traverse motor diagrammatically illustrated at 44. It is contemplated that the traverse motor will have electrical control circuits substantially equivalent to those described in the prior mentioned Vanderzee patent, and that an arm 45 may be provided so that the record turning mechanism of the transfer head may be shifted according to forward or reverse motion of the record magazine.

The selector of the present invention is preferably of circular shape, to correspond to the shape of the magazine. As illustrated, the selector includes a relatively large disc-like wheel 46 having its hub affixed to the rearmost end of the horizontal sleeve 34. The selector wheel has a grooved rim 47 which is drilled to receive an outer row of selector stop pins 48, and an inner row of selector stop pins 49. These are preferably staggered from each other as best shown in Figure 2. The selector stops 48 and 49 may comprise simple cylindrical pins, longitudinally slidable in the bores of the selector wheel. They may be shifted between their normal (unset) position shown at the upper rim of the wheel wherein they project to the left, and the position shown at the lower rim of the wheel wherein they are "set," that is, moved to the right to project on the forward face of the wheel rim. Additional friction means (not shown) may be provided to hold each individual pin in position, if required.

Record selections are made by moving one or more of the individual selector pins 48, 49 to the right, as viewed in Figure 1, so that one end of the pin projects from the forward face of the wheel rim 47. The magazine is provided with sensing fingers and switches mounted on the rear face of the magazine disc 36, so that when the magazine is caused to rotate by the motor 44, the selected record is caused to stop in registry with the record arm 23.

Figures 4, 5, 6:
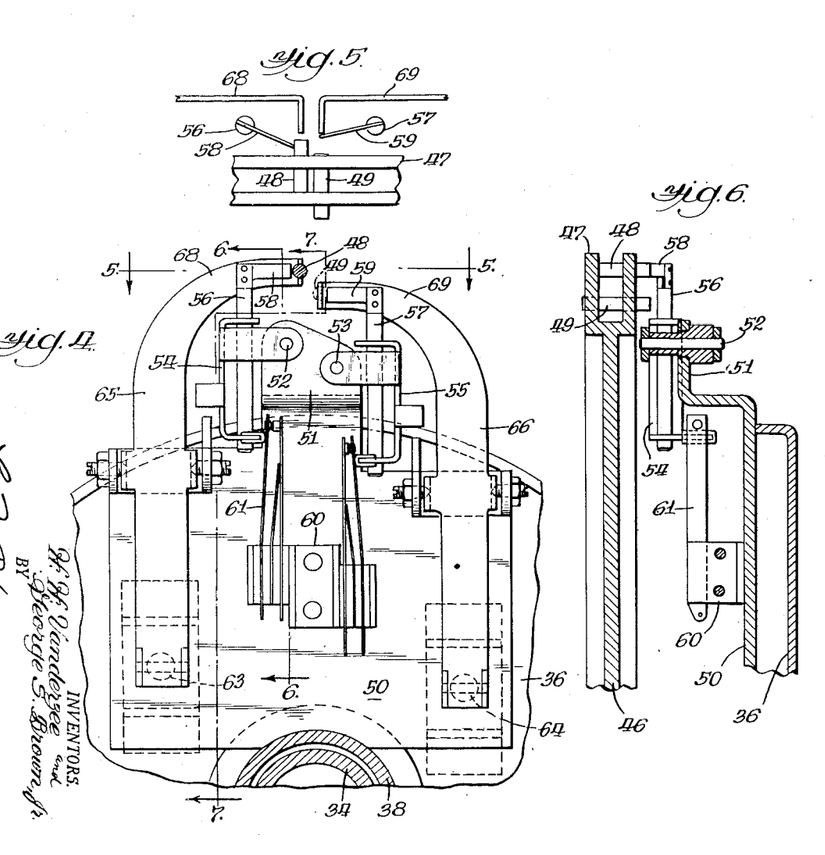
Figure 4 is a fragmental detail view of the sensing scanners and selector stop reset devices of the selector mechanism, the view being taken substantially on the plane of the line 4—4 of Figure 1.
Figure 5 is a fragmental detail sectional view of the sensing scanners of said selector, the view being taken substantially on the plane of the line 5—5 of Figure 4.
Figure 6 is a detail sectional view taken substantially on the plane of the line 6—6 of Figure 4, and showing the operation of the selector sensing fingers and switches associated therewith.

The sensing mechanisms of the machine are best illustrated in Figures 4 to 7 of the present drawings, wherein it will be seen that a bracket 50 attached to the rear face of the magazine disc 36 has a rearwardly offset end portion 51 upon which a pair of horizontal pivots 52 and 53 are mounted (Figures 4 and 6). Each of these pivots supports one of the swinging brackets 54, 55, in which vertical spindles 56 and 57 are pivoted. The upper ends of the spindles 56, 57 have oppositely disposed, outwardly projecting sensing fingers 58, 59. As will be seen from Figures 4 and 5, the finger 58 is angularly disposed with respect to the projecting ends of the outer row of selector stop pins 48, while the finger 59 is oppositely slanted and is aligned with the inner row of pins 49. Thus when either selector finger is drawn across the ends of the pins in one direction, its supporting spindle may pivot freely without imparting motion to the swinging bracket on which it is carried. In the event of motion in the opposite direction, however, the ends of the sensing fingers 58 or 59 will engage the projecting ends of any pins 48, 49 in "set" position, and engagement of these fingers with their respective stop pins will swing the brackets 54 or 55 about their pivots. Thus, when the magazine 27 is rotating in one direction, a "set" pin in the outer row 48 will swing the bracket 54 and actuate electrical contacts 61, which are carried on spring blades supported in an insulating mount 60. Similarly, when the magazine is moving in the opposite direction, a "set" contact in series 49 will be engaged by the end of the sensing finger 59, thus swinging the bracket 55 about the pivot 53 and closing spring contacts 62. Thus the mechanism has two selector stops for each record, representing the selections recorded on the front and back faces. It also has two complete sets of sensing fingers, brackets, and contacts, one for each row of stops.

The transfer mechanism places the record on the turntable either side up, according to the direction of rotation of the magazine. It follows that the selector stops pins 48, for example, may be caused to function on clockwise rotation of the record magazine and cause the front face of any given record to be played, while the pins 49 may be utilized during counterclockwise rotation of the magazine to cause the opposite side of the record to be placed face up on the turntable and reproduced. The contacts 61 and 62 are interconnected to the traverse motor 44 through appropriate control circuits which may be equivalent to those described in the prior Vanderzee patent mentioned above, so that when the end of either finger 58 or 59 comes into abutting engagement with any of the pins 48 or 49, the record magazine will be brought to a stop with the selected record in registry with the record transfer arm. The record is then lifted from the magazine and placed on the turntable by the arm 23 of the transfer mechanism 21.

Figure 7:
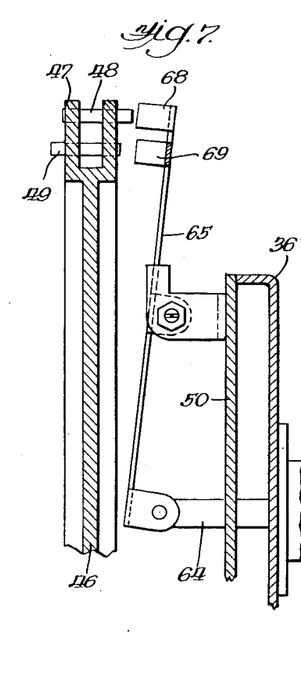
Figure 7 is a detail sectional view taken substantially on the plane of the line 7—7 of Figure 4, and showing one of the electromagnetic selector reset mechanisms.

Concurrently, the selection being played is canceled by operation of one of a pair of solenoids 63, 64, the plungers of which serve to swing rocker arms 65, 66 about pivots on the bracket 50. The arms 65, 66 have curved reset fingers 68, 69 traversing the ends of the outer and inner rows of stop pins respectively, so that when either solenoid is energized, a reset finger is brought against the end of the appropriate selector stop, pushing the selector pin rearwardly until its forward end is flush with the front face of the wheel rim.

In the present embodiment of the invention, the selector stop pins may be set by manually operable mechanism, if desired, although it is equally feasible to set these stops by manipulation of electrical push buttons or by actuation of a remote control coin controlled impulse transmitter, such as conventionally used in connection with present types of automatic phonographs. The selector stop setting mechanism includes a scanning arm 71 having its hub 72 mounted on the innermost end of a slender rotatable tube 73 which extends through the entire length of the magazine supporting sleeve 34, and is journaled in appropriate bearings 75 at the rear of the machine and 76 at the front thereof. The arm 71 is bifurcated and has a pivot pin 77 near its outer end, with a rocker arm 78 mounted on the pivot and including a finger portion 79 extending to the outer rim of the selector wheel and arranged to engage the pins 48, 49 and move them individually. Since the pins 48 and 49 are staggered or offset from each other (Figure 2), the relatively narrow edge of the selecting finger 79 may engage and move any one pin without affecting the others.

The arm 79 may be rocked about its pivot 77 by manual manipulation or by electromagnetic means. A solenoid winding 91 is positioned within the tube 34 but exteriorly of the tube 73, but the solenoid core 92 is positioned within the tube 73 so that upon energization of the coil 91 the core 92 is drawn to the left and its actuating plunger 93 caused to project from the left end of the tube 73 and to engage the inner end of the rocker arm 78, whereby the finger 79 is caused to engage one of the pins 48, 49 and make a selection. When the coil is deenergized, the parts are returned to their normal position by appropriate springs (not shown).

The arm 78 may also be rocked by manually operated means, as by a slender push rod 94 extending through the tube 73 and provided with a manually accessible push button 95 at its forward end. Thus, for manual operation, selections may be made by manually rotating a knob 96 affixed to the forward end of the tube 73, and then depressing a push button 95 to actuate the selecting mechanism and shift any desired selector stop pin. If desired, a series of numerals or other indicia may be inscribed on the dial 97, so that any desired selection may be made by bringing its numeral into alignment with an indicator 98 before depressing the button 95. One selection is made at a time, yet the action of the selector is cumulative, and any or all desired records may be selected by shifting the stop pins corresponding thereto.

While manual operation is contemplated for certain applications, selections will ordinarily be made by electrical means and, as heretofore stated, it is one of the objects of the invention to provide a mechanism which is suitable to use in connection with electrical selectors of either the multiple coded push button type or with remote wall boxes using presently known types of impulse transmitters, or with both. These results are accomplished in the present invention by providing the forward end of the selector control tube 73 with a relatively large gear 101 adapted to mesh with and be driven by the driving pinion 102 of a selector actuating and indexing assembly best shown in Figures 8, 9 and 10. The selector driving and indexing mechanism includes a mounting bracket 103 having lugs 104 on which frame side plates 105 and 106 are carried. A small electrical motor 107 is mounted on the bracket 103, and its armature shaft extends through the bracket 103 and through the plate 106 to a friction roller 108. The roller 108 is in surface engagement with the crowned resilient friction surface 109 on a wheel 110 carried on shaft 111. The shaft is journaled in bearings in the frame plates 105 and 106, respectively. The shaft 111 also carries the aforementioned driving pinion 102 so that the electric motor 107 serves to rotate pinion 102 and gear 101, and thus may rotate the tubular control shaft 73 of the selector and swing the selecting arm 78 and its finger 79 about the axis of the selector wheel in order to cause the finger to scan the entire group of selector stops in both the inner and the outer series.

Figure 8:
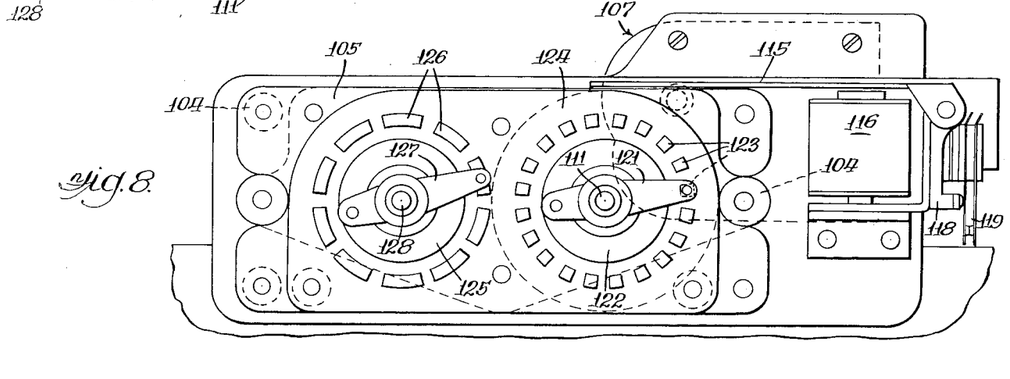
Figure 8 is a front elevational view of the selecting scanner driving and indexing unit, the view being taken at the point indicated by lines 8—8 of Figure 1.
Figure 9:
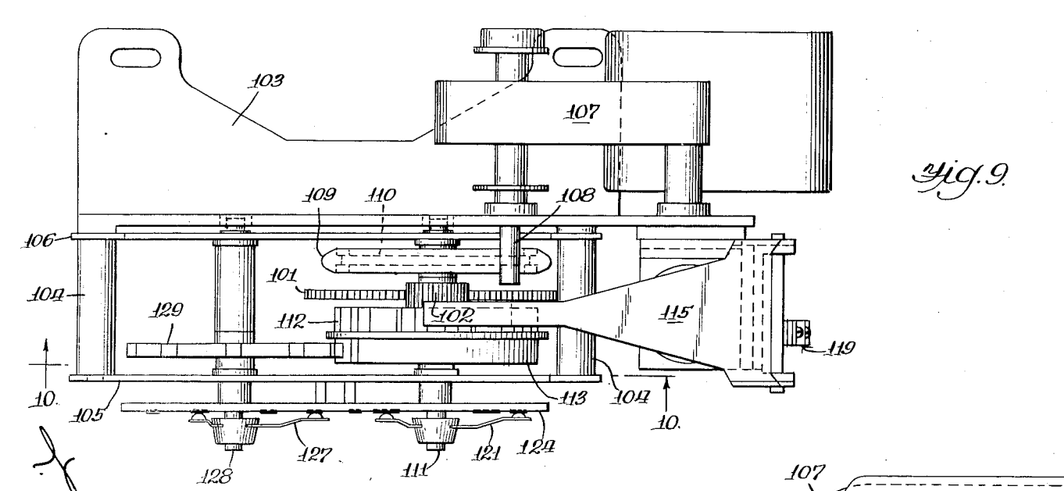
Figure 9 is a detail plan view of the driving and indexing mechanism of Figure 8.

The driving pinion 102 is formed as an integral part of a gear cluster which includes an indexing wheel 112 on one side and a driving wheel 113 on the other. The indexing wheel 112 cooperates with a dog 114 mounted upon a pivoted arm 115. The dog is arranged to be drawn into engagement with the notches of the wheel 112 by actuating an electromagnetic winding 116. The arm 115 also has an extension 118 with an insulating button arranged to actuate a spring contactor 119 so that conventional electrical circuits controlling the scanning motor 107 and selecting solenoid 91 may be automatically actuated upon the operation of the indexing magnet 116.

The forward end of shaft 111 carries the wiper arm 121 of an electrical commutator which, as best shown in Figure 8, includes a metal ring 122 and a series of some 20 contact segments 123, all mounted on an insulating panel 124. The ring 122 is in constant contact with one end of the insulated wiper arm, and the segments 123 are successively engaged by the other end of the wiper arm upon rotation of the shaft 111. A second commutator may be mounted on the same insulating panel 124 as just described, and as shown includes a slip ring 125 surrounded by ten segments 126, with a wiper arm 127 adapted to constantly engage the ring and to successively scan the segments. The wiper arm 127 is mounted on the end of a countershaft 128, but is insulated therefrom in the same manner as the wiper arm 121 is insulated from shaft 111.

Figure 10:
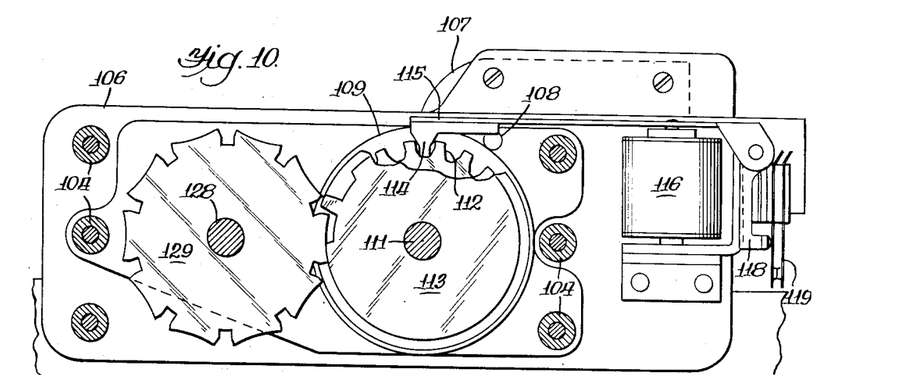
Figure 10 is a detail sectional view taken on the plane of the line 10—10 of Figure 9, showing the gearing between the commutator shafts to control the wiper arms thereof.

The shaft 128 is also journaled in bearings in the plates 105, 106, and is provided with a wheel 129 which meshes with and is driven by the drive wheel 113 (Figure 10). Thus, as motor 107 revolves, the rotation of shaft 111 will cause the wiper arm 121 to scan each of the 20 contact segments 123 once in each revolution of its movement. Also, each revolution of movement of the shaft 111 will cause the drive wheel 113 to move the gear 129 ahead one notch, thus rotating the shaft 128 through one-tenth of a revolution of movement (36°) and advancing the commutator wiper arm 127 from one of the contact segments 126 to the next successive segment. The gear ratio between the pinion 102 and its gear 101 are such that the various positions of the commutators and gears correspond precisely with the various positions in which the selecting finger 79 is in registry with one of the selector stop pins 48, 49. Thus, in the precise embodiment of the machine disclosed herein, the magazine may contain 100 records, so that there are 100 stop pins 48 in one series and 100 stop pins 49 in the second series. The two rows of stop pins are staggered with relationship to each other, however, so that the selector finger may be brought into registry in any one of 200 different angular positions around the selector wheel. These positions then correspond with the position of the 20 contact segments 123 multiplied by 10, representing the number of segments 126 in the other commutator.

Figure 11:
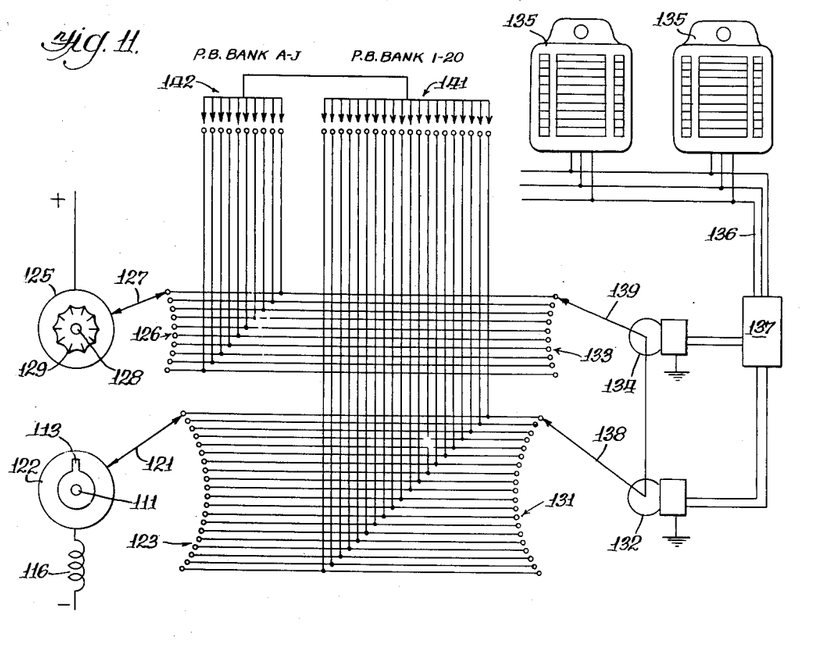
Figure 11 is a schematic wiring diagram of the electrical connections between the commutators, push buttons and stepping switches employed in the selector system, including a diagrammatic illustration of a pair of remote control wall boxes adapted for use with the present selector.

As seen in the wiring diagram of Figure 11, the 20 segments 123 of commutator 121 may be directly connected to a corresponding series of contacts 131 of a stepping switch 132. Similarly, the 10 segments 126 of the commutator 127 may be directly connected to the individual contacts 133 of a second stepping switch 134. The stepping switches 132, 134 may be of conventional design and construction, so that they may be individually and successively controlled by selecting signals or pulses transmitted from one or more wall boxes 135. The wall boxes may be of construction now well known in the art, and will therefore not be described herein except to point out that they include coin controlled mechanisms and selector push buttons adapted to transmit successive series of impulses through cables 136 to a relay box 137 which in turn actuates the stepping switches 132 and 134.

The wiper arms 138 and 139 of the stepping switches may be connected to each other so that a circuit through the indexing magnet 116 is completed whenever the commutators 121 and 127 are brought into positions corresponding to the positions of stepping switch arms 138 and 139 respectively. Thus, when a given series of impulses has been transmitted from one of the wall boxes 135 to the stepping switches 132 and 134, the wiper arms 138, 139 thereof will be caused to position themselves on the contacts 131, 133 in accordance with the selection made at the wall box. Thereupon, the motor 107 is energized through the relay box 137 or otherwise, rotating the shaft 73 and causing the selector finger 79 to pass over or scan the rearward ends of the selector stop pins. Simultaneously, the wipers 121 and 127 of the commutators rotate over and scan the contacts 123, 126, respectively, until these commutator wipers reach the position corresponding to the position of the stepping switch arms. Upon coming into corresponding position, a circuit is completed through the commutators and stepping switches to the indexing magnet 116, bringing the dog 114 into locking engagement with the indexing wheel 112. The selecting mechanism is thus stopped in an indexed position, with the finger 79 of the scanning arm in precise registry with the desired selector pin. The operation of the magnet 116 also actuates contactor 119 to de-energize motor 107, actuate the selecting solenoid 93 and initiate the operation of the transfer mechanism turntable and tone arm control devices in a manner similar to the circuits employed in prior Vanderzee Patent 2,666,649.

The present selector is also adapted for control by coded push buttons. As seen in Figure 11, the contact segments 123 of commutator 121 are each connected to one of the individual push buttons 141 in bank 1-20. Similarly, the individual contacts 126 of commutator 127 are each connected to one of the push buttons 142 in bank A–J. The opposite poles of each of the push buttons are connected to each other. It follows that a selection circuit between any individual contact 123 and another contact 126 may be established by closing one push button in each of the banks. Thus, if the push buttons 141 are numbered 1 to 20, for example, and the push buttons 142 lettered A to J inclusive, any one of the 200 selections available on the machine may be identified by a letter and numeral and may be selected by closing two appropriate push buttons.

Figure 3:
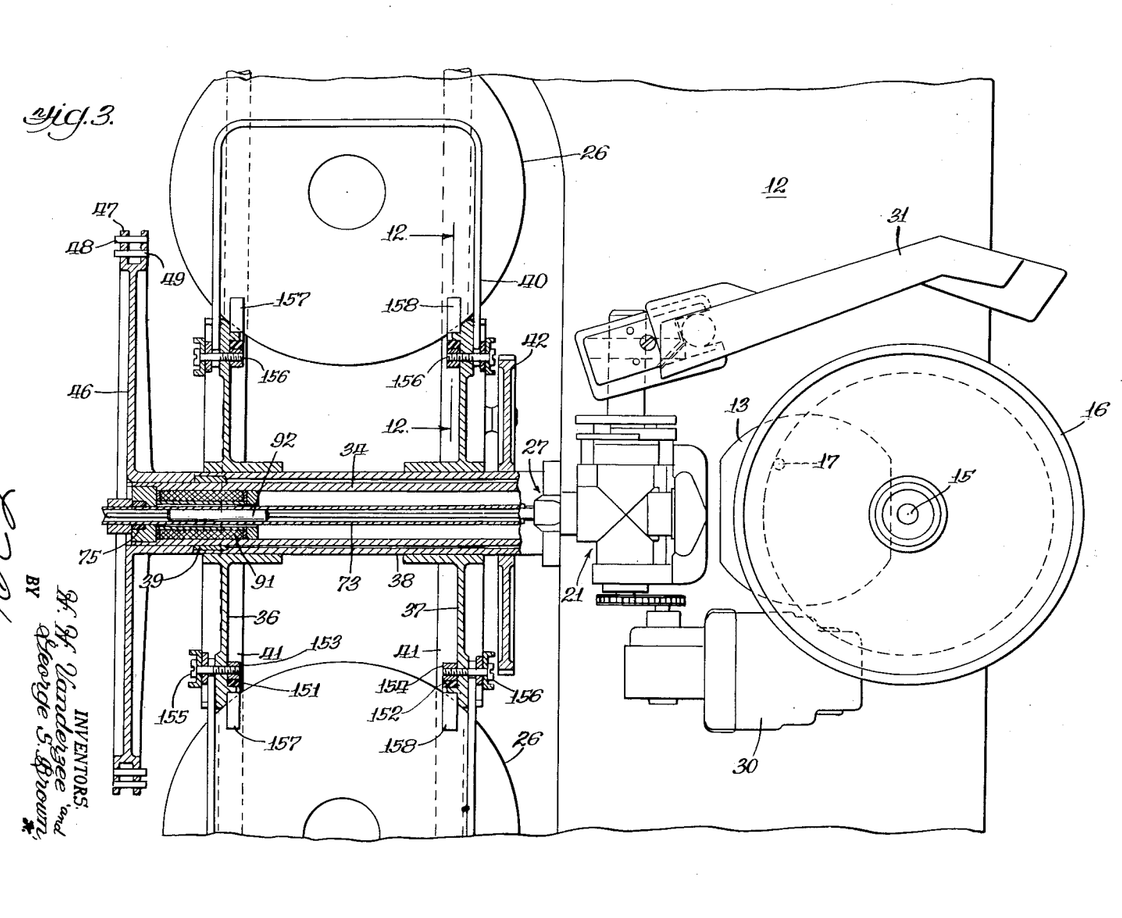
Figure 3 is a fragmental plan view of the record changing mechanism of Figure 1.
Figure 12:
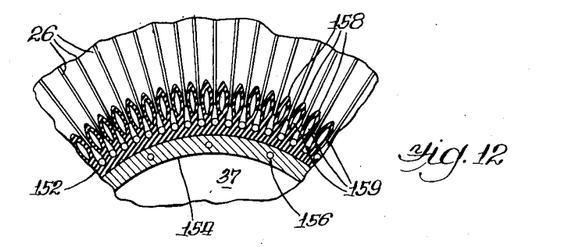
Figure 12 is a detail sectional view of a record retaining device contemplated for use in connection with record magazines of the present invention, the view being taken substantially on the plane of the line 12—12 of Figure 3.

If desired, the individual record discs 26 may be held in the magazine by frictional devices as indicated in Figures 3 and 12. These devices may comprise a pair of molded rubber ring portions 151 and 152 carried on mounting rings 153 and 154, secured to the discs 36 and 37 in any convenient manner, as by machine screws 155 and 156. The outer periphery of each of the rings 151 and 152 is formed to include a plurality of resilient fingers 157, 158 (Figure 12) and, as illustrated, the individual fingers may be hollow at their central portions 159 so as to provide a light, yet resilient and positive grip on the opposite faces of the individual records 26.

Figure 13:
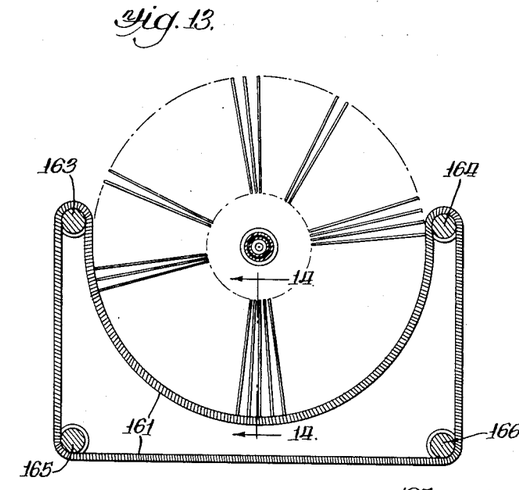
Figure 13 is a diagrammatic illustration of a modified form of record retaining mechanism contemplated for use in connection with the invention.
Figure 14:
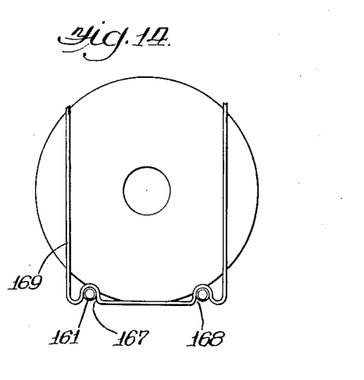
Figure 14 is a detail sectional view taken substantially on the plane of the line 14—14 of Figure 13.

In addition to the record retaining devices described above, it is contemplated that the magazine may be provided with belt-type retainers extending around the lower half of the magazine in place of the slide rails 41 heretofore described. These belts, shown at 161 and 162 in Figures 13 and 14, may be of endless construction and be passed around pulleys 163, 164, 165 and 166, with portions of the belt seating in recesses 167 and 168 in the record separators 169, so that the records are at all times positively held against radial dislodgement.

Figure 15:
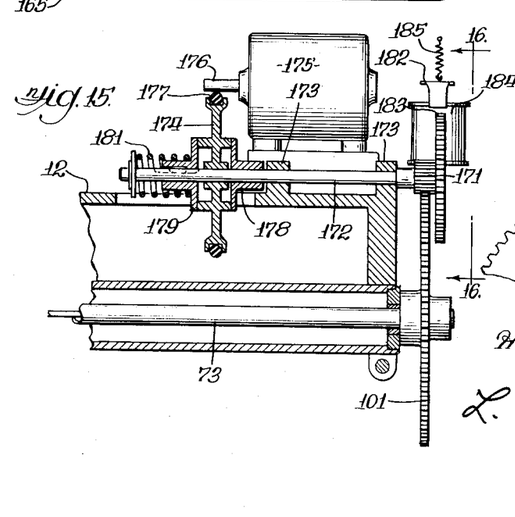
Figure 15 is a fragmental sectional view illustrating a modified form of selector driving and control mechanism.
Figure 16:
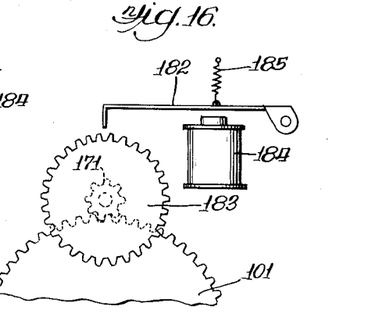
Figure 16 is a fragmental front view of said modified mechanism.

A modified form of selector arm driving mechanism is illustrated in Figures 15 and 16 of the drawings. In this embodiment of the invention, the gear 101 on the tubular shaft 73 (Figure 1) is caused to mesh with a pinion 171 on a shaft 172 journaled in bearings 173 of the frame 12. The shaft 172 has a rotatable wheel 174 thereon and a driving motor 175 is so mounted that its armature shaft 176 is in direct frictional engagement with the resilient rim portion 177 of the wheel. While the wheel 174 is free for rotation on the shaft 172, it is disposed between a pair of clutch discs 178 and 179 which are urged toward each other by a coil spring 181. Thus, when the motor 175 is energized, it will serve to rotate the shaft 173 and drive the gear 101 to move the shaft 73 and the selector arm 78 to any predetermined position. The mechanism is then locked in any desired selecting position by the electromagnetic dog 182 arranged to engage the sprag wheel 183 and provided with a magnetic winding 184 to draw the dog downwardly against the action of a return spring 185.

Figures 17, 18:
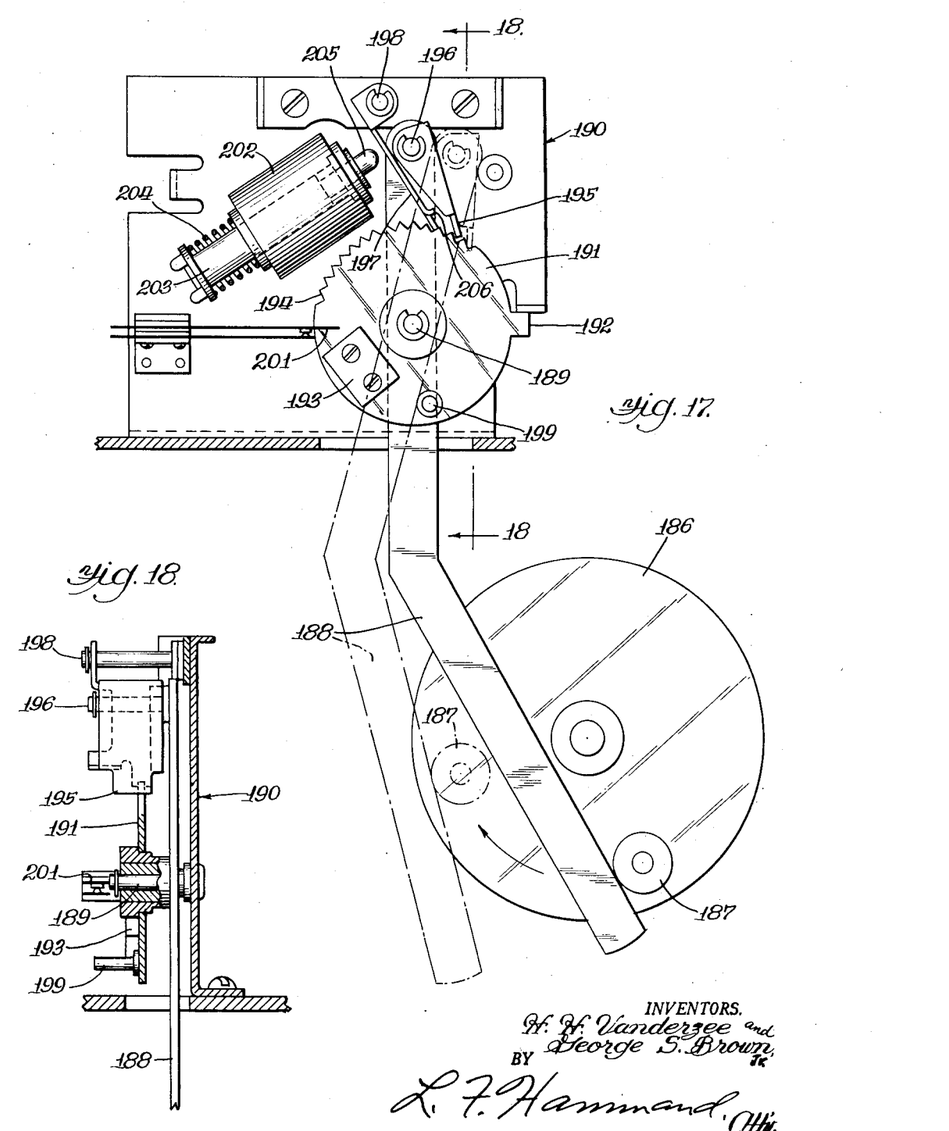
Figure 17 is a detail front view of a scanning control device adapted to control the operation of the magazine and bring it to a halt after all selected records have been played.
Figure 18 is a detail sectional view thereof, taken substantially on the plane of the line 18—18 of Figure 17.

It will be understood that in the operation of the mechanism the record magazine should continue its motion until all of the selector pins 48, 49 in operating position have been engaged by the sensing mechanism, and that the magazine should stop when all selected records have been played. To this end the traverse motor 44 utilized in driving the magazine (Figure 1) may be provided with a crank disc 186 arranged to actuate a scanning control mechanism 190, best illustrated in Figures 17 and 18 of the drawings.

The scanning control unit serves to cause the magazine to continue its scanning movement as long as there are any of the stops 48, 49 in set position, but brings the magazine to a stop after all selected records have been played. As will be seen from Figure 17, the scanning control unit 190 is driven directly from the crank disc 186 on the shaft of motor 44. The disc is provided with a crank stud 187 thereon arranged to engage an operating lever 188 pivotally mounted on a fixed stud 189 of the scanning control unit. The stud 189 also carries a notched counting wheel 191 having a stop portion 192 to limit its movement in a counterclockwise direction, and having a weighted portion 193 to cause the wheel to tend to move in a counterclockwise direction. The wheel is, however, provided with a series of notches 194, and a dog 195 secured to a pivot 196 on the extreme upper end of operating lever 188 is arranged to engage the notches 194. A second dog 197 is mounted on a stationary pivot 198 to prevent unwanted return movement of the wheel 191. Thus, whenever the magazine driving motor 44 is energized, the rotary movement of its armature shaft will cause the crank disc 186 to be rotated and the rotary movement of the disc will cause the crank pin 187 to repeatedly engage the lower end of the arm 188 and move the arm against a spring (not shown) so it swings back and forth between the dotted and solid line positions illustrated. The action of the crank 187 in this respect will be the same irrespective of whether the disc 186 is moving in a clockwise direction or counterclockwise direction. It follows that the operation of the mechanism is the same with either direction of rotation of the magazine. In either case, as the arm 188 is moved back and forth, the notches 194 of the counting wheel 191 will advance the wheel in a step-by-step clockwise movement. This motion, if continued through a complete scanning cycle of the magazine, will cause the pin 199 to engage the contacts 201 and break the circuit to the motor 44, bringing the magazine to a halt. The switch 201 will not be actuated so long as any selector pin 48, 49 remains in displaced position, however, since a resetting solenoid 202 is tripped whenever a selection is made. The solenoid 202 is electrically connected in parallel with the selector solenoid 91 (Figure 1), so that whenever a selection is made the core 203 of the solenoid will move inwardly against the action of a return spring 204 and project a plunger portion 205 into engagement with the dog 197. The dog is further provided with a projection 206 adapted to engage and release the dog 195. Thus, every actuation of the solenoid 202 releases both dogs and permits the wheel 191 to return to its initial position under the influence of a return weight 193.

From the foregoing it should be apparent that the teachings of the present invention provide a phonographic record changer which is extremely compact and relatively simple throughout, yet which is capable of successfully handling an unusually large number of recorded selections. Moreover, it is so designed as to effect selection of the records desired for play in an unusually simple, direct and straightforward fashion. It is to be particularly noted that the present mechanism does not require an individual actuating magnet for each selection, as is quite common in multiple selectors of the prior art. It follows that the terrific number of selector magnets required by present day machines of large magazine capacity are completely eliminated, as are the expensive and bulky conductor cables ordinarily required in this type of equipment. Obviously, the labor involved in soldering the multitudinous electrical connections required in systems heretofore regarded as conventional is also eliminated, so that both manufacturing and maintenance operations are simplified.

It is also to be noted that, since the present mechanism does not require a large number of actuating magnets to be nested in a limited space, the magnetic actuators of the present device may be made sufficiently large and powerful so that they are capable of exerting adequate force to accomplish the mechanical acts involved. This construction eliminates difficulties encountered in prior devices wherein the rather small, low energy magnets required for close nesting may require overly delicate adjustments, or be overly susceptible to malfunctioning due to accumulation of dirt, dust or corrosion.

It is also worthy of note that the selector of the present system is entirely compatible for use in connection with remote control wall boxes of types heretofore commercially manufactured, since such wall boxes are designed to transmit coded impulses controlling the movement of a pair of stepping switches and are entirely suitable to the control of the stepping switches utilized herein. At the same time, manual control or control by coded push buttons is also entirely feasible.

Having thus described our invention, what we claim as new and desire to secure by United States Letters Patent is:

1. In a phonographic record changer having a record magazine and a record transfer mechanism relatively movable with respect to each other, and a traverse motor for relatively moving one with respect to the other whereby the transfer mechanism may successively pass across the several records in the magazine and move into position to engage any record carried therein, an accumulating selector mechanism comprising a selector frame, at least one series of selector stops corresponding in number to the number of record positions in the magazine, and a sensing scanner arranged to traverse the series of selector stops and including an electric switch to control the traverse motor thereby; in combination with a selecting scanner common to the selector stops of said series and adapted to traverse the same; a setting finger on said scanner adapted to successively come into registry with the individual selector stops of said series; a scanning motor for uninterruptedly moving said selecting scanner and finger continuously with respect to said selector frame and selector stops; scanning motor control circuits including an electrical commutator driven by said scanning motor and selector switches interconnected with said commutator to stop the aforementioned setting finger at a position of registry with any one of the aforementioned selector stops, and an electromagnetic coil operative through said finger to individually set said selector stops.

2. In a phonographic record changer having a record magazine and a record transfer mechanism relatively movable with respect to each other, and a traverse motor for relatively moving one with respect to the other whereby the transfer mechanism may successively pass across the several records in the magazine and move into position to engage any record carried therein, an accumulating selector mechanism comprising a selector frame, at least one series of selector stops consisting of longitudinally shiftable slide pins corresponding in number to the number of record positions in the magazine, and a sensing scanner arranged to traverse one end of each of said slide pins with a switch arm adapted to engage projecting pins in said series and to control the traverse motor thereby; in combination with a selecting scanner common to the selector stops of said series and adapted to traverse the same; a setting finger on said scanner adapted to successively come into registry with the other ends of the individual selector stop pins of said series; a scanning motor for uninterruptedly moving said selecting scanner and finger with respect to said selector frame and selector stops; scanning motor control circuits to stop the aforementioned setting finger at a position of registry with any one of the aforementioned selector stop pins, and electromagnetic means interconnected to said finger to move said finger into selective engagement with one of said stop pins at a time to slide said pins longitudinally and to thus individually set said selector stops.

3. In a phonographic record changer having a record magazine and a record transfer mechanism relatively movable with respect to each other, and a traverse motor for relatively moving one with respect to the other whereby the transfer mechanism may successively pass across the several records in the magazine and move into position to engage any record carried therein, an accumulating selector mechanism comprising a selector frame, at least one series of selector stops consisting of longitudinally shiftable slide pins corresponding in number to the number of record positions in the magazine, and a sensing scanner arranged to traverse one end of each of said slide pins with a switch arm adapted to engage projecting pins in said series and to control the traverse motor thereby; in combination with a selecting scanner common to the selector stops of said series and adapted to traverse the same; a setting finger on said scanner adapted to successively come into registry with the other ends of the individual selector stop pins of said series; a scanning motor for uninterruptedly moving said selecting scanner and finger continuously with respect to said selector frame and selector stops; scanning motor control circuits including an electrical commutator driven by said scanning motor and selector switches interconnected with said commutator to stop the aforementioned setting finger at a position of registry with any one of the aforementioned selector stop pins, and electromagnetic means interconnected to said finger to move said finger into selective engagement with one of said stop pins at a time to slide said pins longitudinally and to thus individually set said selector stops.

4. In a phonographic record changer having a record magazine and a record transfer mechanism relatively movable with respect to each other, and a traverse motor for relatively moving one with respect to the other whereby the transfer mechanism may successively pass across the several records in the magazine and move into position to engage any record carried therein, an accumulating selector mechanism comprising a selector frame, at least one series of selector stops corresponding in number to the number of record positions in the magazine, and a sensing scanner arranged to traverse the series of selector stops and to control the traverse motor thereby; in combination with a selecting scanner common to the selector stops of said series and adapted to traverse the same; a setting finger on said scanner adapted to successively come into registry with the individual selector stops of said series; a scanning motor for uninterruptedly moving said selecting scanner and finger continuously with respect to said selector frame and selector stops; scanning motor control circuits including a pair of multiple contact electrical commutators and a pair of selecting switch banks interconnected to said commutators and to each other. an electromagnetic coil operative through said finger to individually set said selector stops, and indexing devices to hold the aforementioned setting finger in registry with the selector stops as said coil is energized.

5. In a phonographic record changer having a toroidal record magazine and a record transfer mechanism relatively movable with respect to each other, and a traverse motor for relatively moving one with respect to the other whereby the transfer mechanism may successively pass across the several records in the magazine and move into position to engage any record carried therein, the combination of an accumulating selector having a frame comprising a wheel coaxial with the axis of the record magazine; a plurality of selector stops consisting of individually shiftable slide pins corresponding in number to the number of record positions in the magazine and mounted for longitudinal shiftable movement in the rim of the selector wheel; a selecting scanner common to said stop pins and comprising a swinging arm pivoted at the center of the wheel and movable in a circle therearound, a setting finger comprising a rocker arm pivoted on the aforementioned scanner and adapted to individually engage any one of the aforementioned selector stop pins, and a scanning motor driving said scanner in relative rotary movement with respect to said selector wheel; scanning motor control circuits including a multiple contact electrical commutator driven by said scanning motor and having electrical circuits adapted to interrupt the operation of the scanning motor to stop the aforementioned setting finger at a position of registry with any one of the aforementioned selector stop pins, with a magnetic solenoid and plunger adapted to rock the aforementioned setting finger and slide one of the selector stop pins longitudinally in the wheel rim; together with at least one sensing scanner adapted to engage the shiftable selector stop pins and having a switch controlled thereby to interrupt the operation of the traverse motor.

6. In a phonographic record changer having a toroidal record magazine and a record transfer mechanism relatively movable with respect to each other, and a traverse motor for relatively moving one with respect to the other whereby the transfer mechanism may successively pass across the several records in the magazine and move into position to engage any record carried therein, the combination of an accumulating selector having a frame comprising a wheel coaxial with the axis of the record magazine, a series of selector stops in the rim of the selector wheel, and a selecting scanner common to all of said stops and comprising a swinging arm pivoted at the center of the wheel and movable in a circle therearound, a setting finger carried on the aforementioned swinging arm and adapted to move into a position of registry with any one of the aforementioned selector stops, a scanning motor driving said swinging selector arm in relative rotary movement with respect to said selector frame; scanning motor control circuits including a pair of multiple contact electrical commutators and a pair of selecting switch banks interconnected to said commutators and to each other to control the operation of the scanning motor, with an electromagnetic coil operative through said setting finger to set one of the selector stops in the wheel rim at a time, together with at least one sensing scanner having a switch controlled by said stops to interrupt the operation of the aforementioned traverse motor.

7. The combination, with a phonographic record changer, of a record selecting system comprising a multiplicity of selector stops and a selecting scanner shiftable with respect thereto; said scanner having a selecting stop setting device common to a plurality of stops and movable thereover, with positioning means including an electrical commutator geared to said selecting scanner for movement therewith; a motor for driving said scanner and commutator simultaneously, and indexing mechanism to stop said motor and position said selector and commutator at any one of a plurality of positions; with electrical switching means in series with said commutator to actuate said indexing mechanism; said switching means including a pulse actuated stepping switch.

8. The combination, with a phonographic record changer, of a record selecting system comprising a multiplicity of selector stops and a selecting scanner shiftable with respect thereto; said scanner having a selecting stop setting device common to a plurality of stops and movable thereover, with positioning means including an electrical commutator geared to said selecting scanner for movement therewith; a motor for driving said scanner and commutator simultaneously, and indexing mechanism to stop said motor and position said selector and commutator at any one of a plurality of positions; with electrical switching means in series with said commutator to actuate said indexing mechanism.

9. The combination, with a phonographic record changer, of a record selecting system comprising a multiplicity of selector stops and a selecting scanner shiftable with respect thereto; said scanner having a selecting stop setting device common to a plurality of stops and movable thereover, with positioning means including an electrical commutator geared to said selecting scanner for movement therewith, a motor for driving said scanner and commutator simultaneously, and indexing mechanism to stop said motor and position said selector and commutator at any one of a plurality of positions.

10. In a selecting system, a selecting member carried by a movable scanning mechanism and magnetic actuating means adapted for momentary operation of said selecting member at any one of a plurality of different selecting positions of said scanning mechanism; a multiple contact electrical commutator geared to the selector scanning mechanism and movable therewith, with the positions of the individual contacts of said commutators corresponding to predetermined selecting position of the selecting member and scanning mechanism; and electrical switching means in series with said commutator and said magnetic actuating means to actuate said selecting member upon reaching a predetermined position of said commutator.

11. In a phonographic record changer having a record magazine and a record transfer mechanism relatively movable with respect to each other, and a traverse motor for relatively moving one with respect to the other whereby the transfer mechanism may successively pass across the several records in the magazine and move into position to engage any record carried therein, an accumulating selector mechanism comprising at least one series of selector stops corresponding in number to the number of record positions in the magazine, and a sensing scanner arranged to traverse the series of selector stops to control operation of the record changer; in combination with a selecting scanner common to the selector stops of said series and adapted to traverse the same; a stop setting device on said scanner adapted to successively come into registry with the individual selector stops of said series; a scanning motor for moving said selecting scanner and stop setting device with respect to said selector frame and selector stops; scanning motor control circuits including an electrical commutator driven by said scanning motor and selector switches interconnected with said commutator to stop the aforementioned setting finger at a position of registry with any one of the aforementioned selector stops, and an electromagnetic coil operative through said finger to individually set said selector stops.

12. In a phonographic record changer having a record magazine and a record transfer mechanism relatively movable with respect to each other, and a traverse motor for relatively moving one with respect to the other whereby the transfer mechanism may successively pass across the several records in the magazine and move into position to engage any record carried therein, an accumulating selector mechanism comprising a selector frame, at least one series of selector stops consisting of longitudinally shiftable slide pins corresponding in number to the number of record positions in the magazine, and a sensing scanner arranged to traverse one end of each of said slide pins to engage projecting pins in said series and to control the record changer thereby; in combination with a selecting scanner and stop setting device common to the selector stops of said series and adapted to successively come into registry with the other ends of the individual selector stop pins of said series; a scanning motor for moving said selecting scanner and stop setting device with respect to said selector frame and selector stops; and electromagnetic means interconnected to said stop setting device to move it into selective engagement with one of said stop pins at a time to slide said pins longitudinally and to thus individually set said selector stops.

13. In a phonographic record changer having a toroidal record magazine and a record transfer mechanism relatively movable with respect to each other, and a traverse motor for relatively moving one with respect to the other whereby the transfer mechanism may successively pass across the several records in the magazine and move into position to engage any record carried therein, the combination of an accumulating selector having a frame comprising a wheel coaxial with the axis of the record magazine; a plurality of selector stops consisting of individually shiftable slide pins corresponding in number to the number of record positions in the magazine and mounted for longitudinal shiftable movement in the rim of the selector wheel; a selecting scanner common to said stop pins and movable in a circle therearound, a setting finger adapted to individually engage any one of the aforementioned selector stop pins, and a scanning motor driving said scanner in relative rotary movement with respect to said selector wheel; scanning control means to actuate the aforementioned setting finger at a position of registry with any one of the aforementioned selector stop pins, with a magnetic solenoid and plunger adapted to slide one of the selector stop pins longitudinally in the wheel rim; together with at least one sensing scanner adapted to engage the shiftable selector stop pins to interrupt the motion of the magazine.

References Cited in the file of this patent
UNITED STATES PATENTS

| | | |
|---|---|---|
| 2,098,216 | Andres | Nov. 9, 1937 |
| 2,137,276 | Erbe | Nov. 22, 1938 |
| 2,234,937 | Wilcox | Mar. 11, 1941 |
| 2,301,908 | Wilcox | Nov. 10, 1942 |
| 2,304,590 | Osborne | Dec. 8, 1942 |
| 2,319,788 | Bryan et al. | May 25, 1943 |
| 2,366,940 | Solkover | Jan. 9, 1945 |
| 2,382,487 | Kenney et al. | Aug. 14, 1945 |
| 2,503,335 | Hardwick | Apr. 11, 1950 |
| 2,578,378 | Stolberg | Dec. 11, 1951 |
| 2,624,795 | Bodoh | Jan. 6, 1953 |
| 2,634,402 | Vanderzee | Apr. 7, 1953 |
| 2,686,677 | MacDuff | Aug. 17, 1954 |